(12) United States Patent
Dehring et al.

(10) Patent No.: US 9,187,982 B2
(45) Date of Patent: Nov. 17, 2015

(54) APPARATUS AND METHODS FOR PROVIDING NATURAL GAS TO MULTIPLE ENGINES DISPOSED UPON MULTIPLE CARRIERS

(71) Applicant: Baker Hughes Incorporated, Houston, TX (US)

(72) Inventors: Pierce Gregory Dehring, Tomball, TX (US); Blake Burnette, Tomball, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 329 days.

(21) Appl. No.: 13/803,359

(22) Filed: Mar. 14, 2013

(65) Prior Publication Data

US 2014/0261695 A1    Sep. 18, 2014

(51) Int. Cl.
| | |
|---|---|
| *E21B 41/00* | (2006.01) |
| *E21B 43/26* | (2006.01) |
| *B65H 75/42* | (2006.01) |
| *B65H 75/44* | (2006.01) |
| *F17D 1/04* | (2006.01) |
| *F02M 21/00* | (2006.01) |
| *F02M 21/02* | (2006.01) |

(52) U.S. Cl.
CPC ............... *E21B 41/00* (2013.01); *B65H 75/425* (2013.01); *B65H 75/4478* (2013.01); *E21B 43/26* (2013.01); *F02M 21/00* (2013.01); *F02M 21/02* (2013.01); *F02M 21/023* (2013.01); *F02M 21/029* (2013.01); *F02M 21/0218* (2013.01); *F17D 1/04* (2013.01); *Y10T 137/0318* (2015.04); *Y10T 137/8593* (2015.04); *Y10T 137/87877* (2015.04)

(58) Field of Classification Search
CPC .... B65H 75/425; B65H 75/4478; F17D 1/04; F02M 21/00; F02M 21/02; F02M 21/0218; F02M 21/0227; F02M 21/023; F02M 21/029; E21B 41/00; E21B 43/26; E21B 43/261; E21B 43/263; E21B 43/2635; E21B 43/267; Y10T 137/8593; Y10T 137/0318; Y10T 137/87877
USPC ............... 137/565.01, 565.11, 899, 351, 354, 137/355.12, 355.16, 883
See application file for complete search history.

(56) References Cited

U.S. PATENT DOCUMENTS

| | | | |
|---|---|---|---|
| 8,899,268 B2* | 12/2014 | Garner et al. ................. | 137/615 |
| 2005/0199225 A1* | 9/2005 | Davis ............................. | 123/557 |
| 2010/0072757 A1* | 3/2010 | Kealy et al. .................... | 290/1 A |
| 2012/0255734 A1* | 10/2012 | Coli et al. .................. | 166/305.1 |
| 2014/0318638 A1* | 10/2014 | Harwood et al. ........ | 137/355.12 |

* cited by examiner

*Primary Examiner* — William McCalister
*Assistant Examiner* — Ian Paquette
(74) *Attorney, Agent, or Firm* — E. Randall Smith; Jones & Smith, LLP

(57) ABSTRACT

Apparatus for providing natural gas from an external gas source to multiple engines disposed upon multiple carries includes a gas supply conduit mounted upon each carrier. Each gas supply conduit has a connector conduit engaged at one end therewith and being releasably engageable at the other end with the gas supply conduit of another carrier or the gas source.

19 Claims, 3 Drawing Sheets

# APPARATUS AND METHODS FOR PROVIDING NATURAL GAS TO MULTIPLE ENGINES DISPOSED UPON MULTIPLE CARRIERS

FIELD OF THE DISCLOSURE

The present disclosure relates generally to supplying fuel to engines and, more particularly, apparatus and methods for providing natural gas to engines mounted on multiple carriers.

BACKGROUND

Bi-fuel engines have been developed that can be powered by a combination or mixture of different types of fuels. For example, some bi-fuel engines can be powered by a mixture of diesel fuel and natural gas (or other methane-based fuels). As used herein and in the appended claims, the terms "natural gas" and variations thereof mean natural gas and any other methane-based fuels. When utilizing different types of fuels, one challenge lies in connecting the engine to the multiple fuel sources. This challenge can be particularly significant in scenarios involving multiple engines that each need to be provided with multiple types of fuel.

For example, in the hydrocarbon exploration and production industries, various operations involve the use of multiple engines, such as hydraulic fracture stimulation with the use of multiple fracturing fluid pumping units. Oftentimes, a series of fracturing fluid pumping units are used concurrently at a single well. Since time is of the essence in the hydrocarbon exploration and production industries due to high equipment leasing, manpower and other costs, it is greatly advantageous to simplify operations and save time and manpower. In this instance, it would be beneficial to be able to quickly, easily and/or efficiently connect multiple engines to the natural gas source(s).

It should be understood that the above-described examples, features and potential limitations are provided for illustrative purposes only and are not intended to limit the scope or subject matter of this disclosure or any related patent application or patent. Thus, none of the appended claims or claims of any related patent application or patent should be limited by the above examples, features and limitations or required to address, include or exclude the above-cited examples, features and/or potential limitations merely because of their mention above.

Accordingly, there exists a need for improved systems, apparatus and methods useful in connection with providing natural gas to multiple engines having one or more of the features, attributes or capabilities described or shown in, or as may be apparent from, the other portions of this patent.

BRIEF SUMMARY OF THE DISCLOSURE

In some embodiments, the present disclosure involves apparatus for providing natural gas from an external gas source to engines disposed upon multiple mobile hydraulic fracturing pump units. Each pump unit carries at least one engine. The apparatus includes a natural gas supply system disposed upon each hydraulic fracturing pump unit. Each natural gas supply system includes a gas supply conduit and a connector conduit. The gas supply conduit is mounted to the associated hydraulic fracturing pump unit and includes at least one fluid flow port formed between its ends. The fluid flow port fluidly communicates with the engine of the pump unit. A connector conduit is mechanically and fluidly engaged at its first end with the gas supply conduit. The second end of the connector conduit is configured to be extended outwardly relative to the gas supply conduit and selectively releasably mechanically and fluidly engaged with the gas source, or the second end of the gas supply conduit of another pump unit. Thus, a first mobile hydraulic fracturing pump unit is connectable to the gas source for providing natural gas to its engine and the engine of each successively mechanically and fluidly interconnected mobile hydraulic fracturing pump unit.

In many embodiments, the present disclosure involves apparatus for providing natural gas from an external gas source to multiple engines disposed on multiple carriers. Each carrier has at least one engine thereon. The apparatus includes a natural gas supply system disposed upon each carrier. Each natural gas supply system includes at least one rigid gas supply conduit, gas feed line, fluid flow control valve, particulate filter, coalescing filter and flexible connector. The gas supply conduit is mounted to the associated carrier and includes at least one fluid flow port formed between its ends. The gas feed line fluidly couples the fluid flow port of the gas supply conduit to the engine of the associated carrier.

The fluid flow control valve fluidly couples the fluid flow port of the gas supply conduit and the gas feed line, and is disposed proximate to the fluid flow port. The particulate and coalescing filters are disposed between and in fluid communication with the gas supply conduit and the gas feed line. The flexible connector conduit is mechanically and fluidly engaged at its first end with the rigid gas supply conduit at its first end. The second end of the flexible connector conduit is configured to extend outwardly relative to the gas supply conduit and selectively releasably mechanically and fluidly engaged with the gas source, or the second end of the gas supply conduit of another carrier. Thus, a series of engines disposed upon different carriers may be fluidly interconnected for delivering natural gas to each engine.

There are embodiments of the present disclosure that involve a method of providing natural gas from an external gas source to multiple engines disposed upon multiple mobile hydraulic fracturing pump units. The method includes fluidly and mechanically releasably connecting the first end of a flexible connector conduit extending from a rigid gas supply conduit mounted on a first pump unit to the gas source. Its second end is mechanically and fluidly coupled to the first end of the rigid gas supply conduit. The first end of a flexible connector conduit extending from a gas supply conduit mounted on a second pump unit is releasably connected to the second end of the gas supply conduit of the first pump unit. The second end of that flexible connector conduit is coupled to the first end of the gas supply conduit on the second pump unit. Similarly the first end of a flexible connector conduit extending from a gas supply conduit mounted on a third pump unit is releasably coupled to the second end of the gas supply conduit of the second pump unit, and its second end is coupled to the first end of the gas supply conduit on the third pump unit. The second end of the rigid gas supply conduit on the third pump unit is capped off.

Accordingly, the present disclosure includes features and advantages which are believed to enable it to advance engine fuel supply technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
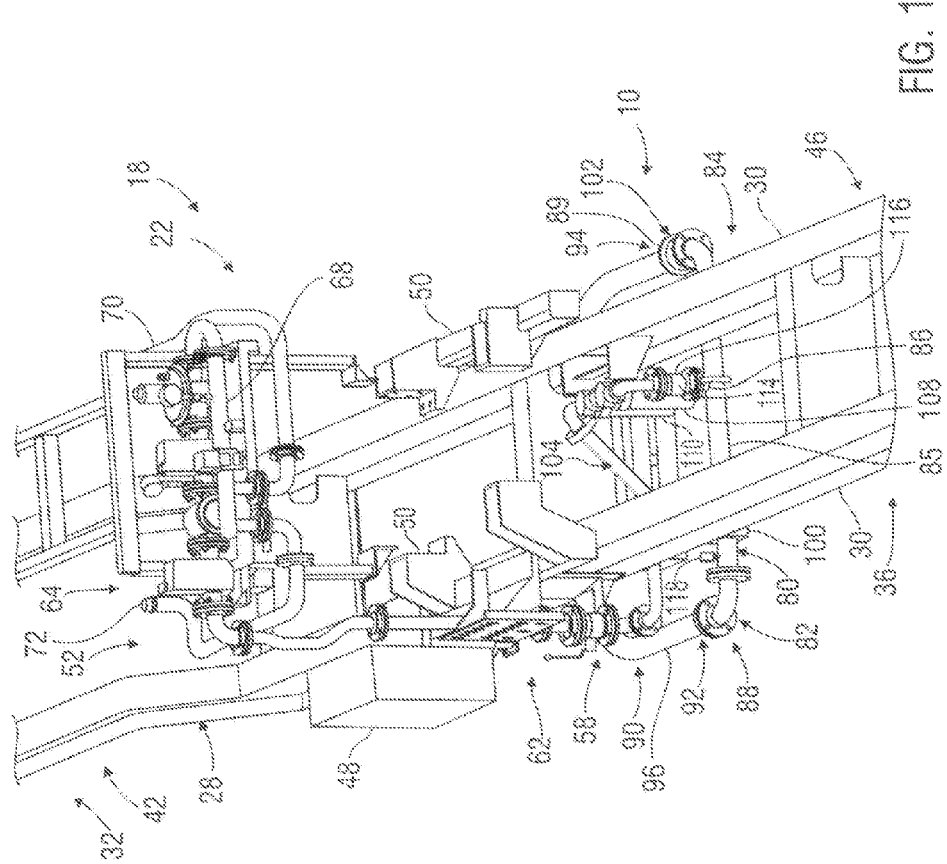
FIG. 1 is a perspective view of an embodiment of a natural gas supply system mounted on an exemplary carrier in accordance with the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, in accordance with the present disclosure, an embodiment of a natural gas supply system 10 for providing natural gas from at least one external gas source 130 (e.g. FIG. 3) to at least one engine 140 (e.g. FIG. 2) disposed on a carrier 18 is shown. As used herein and in the appended claims, the terms "carrier" and variations thereof means any transportable or movable device, such as, for example, a skid or other frame, trailer, truck, automobile and other types of land-based equipment, a ship, barge and other types of waterborne vessels, etc. The gas source may be any suitable supplier of natural gas, such as an LNG or CNG unit or a natural gas pipeline. It should be understood that the present disclosure is not limited by the type of carrier 18 or gas source 130 with which the supply system 10 may be used.

The carrier 18 may have any form, configuration and operation. In this example, the carrier 18 is a mobile trailer-mounted hydraulic fracturing pump unit 22. For example, the pump unit 22 may include a bi-fuel Rhino pump unit mounted on an 18-wheel trailer or skid, as offered by Baker Hughes Incorporated. The illustrated pump unit 22 includes an elongated frame, or chassis, 28 extending from its front end 32 to its rear end 36. The exemplary frame 28 has two elongated frame rails 30 forming its left and right sides 42, 46, and carries at least one engine 140 (e.g. FIG. 2) and fluid pump useful for pumping fluid into an underground well, such as for hydraulic fracturing, acid stimulation, work-over or remediation operations. However, the type, configuration, operation and uses of the engine(s) and pump(s) are not limiting upon the present disclosure. In this example, the engine 140 (e.g. FIG. 2) may, when desired, be powered by a mixture of diesel fuel and natural gas.

The illustrated frame 28 is shown having a bi-fuel control panel 48, transmission mounts 50 and a gas inflow system 52. The gas inflow system 52 provides natural gas to the engine 140 (e.g. FIG. 2) and may include, for example, a flow control valve 58, pressure regulator 62, gas train 64, gas supply manifold 68 and other components. In this example, natural gas is provided to the engine 140 (e.g. FIG. 2) from the gas train 64 through flow pipes 70, 72. However, the gas inflow system 52 and overall pump unit 22 may have additional or different components.

The aforementioned components of the hydraulic fracturing pump unit 22 and further details of their form, configuration and operation are known in the art. Moreover, the present disclosure is not limited to use with the exemplary hydraulic fracturing pump unit 22, and may be used with any other type of hydraulic fracturing pump unit 22 or other carrier 18 having some or all of the same or similar components as described above, or having different components. Further, it should be understood that all the various features of the present disclosure as described below and shown in the appended drawings are not limited to use with hydraulic fracturing pump units 22, but can be used with any other type of carrier 18 having one or more engines 140 (e.g. FIG. 2) that need to be supplied with natural gas.

Still referring to FIG. 1, now in accordance with an embodiment of the present disclosure, the natural gas supply system 10 includes at least one gas supply conduit 80 and at least one releasable connector conduit 90. The illustrated gas supply conduit 80 is mounted upon the pump unit 22 and has open ends 82, 84. At least one fluid flow port 86 is formed in the exemplary gas supply conduit 80 between its ends 82, 84 for providing natural gas to the gas inflow system 52 and ultimately to the engine 140 (e.g. FIG. 2). In this embodiment, the port 86 flows into a T-joint 87 (FIG. 3) extending from the gas supply conduit 80.

The illustrated connector conduit 90 is shown engaged with the ends 82, 84 of the gas supply conduit 80. The connector conduit 90 and gas supply conduit 80 may be connected in any suitable manner. In this example, the first open end 92 of the connector conduit 90 is mechanically and fluidly engaged to a coupling 88 at the first end 82 of the gas supply conduit 80. The second open end 94 of the exemplary connector conduit 90 is mechanically and fluidly engaged to a coupling 89 at the second end 84 of the gas supply conduit 80. This configuration represents a "stored" position of the exemplary the connector conduit 90, such as during non-use of the natural gas supply system 10, transport of the hydraulic fracturing pump unit 22 between job sites, etc.

The gas supply conduit 80 and connector conduit 90 may have any suitable form, configuration and operation. In this embodiment, the gas supply conduit 80 is a rigid pipe 85 and the connector conduit 90 is a flexible pipe 96. For example, the gas supply conduit 80 may be a 53" long section of 3" diameter galvanized steel pipe, and the connector conduit 90 may be an eight foot long section of 3" diameter stainless steel braided hose. However, the present disclosure is not limited to these example dimensions or types of conduits.

Still referring to FIG. 1, the gas supply conduit 80 may provide natural gas to the gas inflow system 52 and ultimately to the engine(s) 140 (e.g. FIG. 2) in any suitable manner. In this embodiment, at least one gas feed line 104 fluidly connects the fluid flow port(s) 86 of the gas supply conduit 80 with the flow control valve 58 of the gas inflow system 52. If desired, at least one particulate filter 108 and/or coalescing filter 110 may be fluidly connected to the gas feed line 104. In the illustrated example, the filters 108, 110 are positioned proximate to the gas supply conduit 80 to filter water and particulate matter from the natural gas before reaching the gas inflow system 52 and engine 140 (e.g. FIG. 2). For example, the filters 108, 110 may assist in protecting the various sensitive downstream components on the carrier 18, such as regulators, shut-off valves, the engine 140, etc.

If desired, at least one flow control valve 114 may be fluidly connected to the gas supply conduit 80 or gas feed line 104. In this embodiment, the valve 114 connects to the T-joint 87 (FIG. 3) of the gas supply conduit 80 and allows the inflow of natural gas from the gas supply conduit 80 to be selectively shut-off before reaching any other components. In some applications, the valve 114 may be useful, for example, to isolated the gas supply conduit 80, such as to allow servicing and maintenance of the gas supply system 10 or other components on the carrier 18, serve as an emergency shut-off, or any other suitable purpose.

When included, the control valve 114 may have any suitable form, configuration and operation. In this example, the valve 114 is manually-operated ball valve 116. The illustrated valve 114 is selectively movable between at least one open position and at least one closed position. In the closed position, the exemplary valve 114 prevent the flow of natural gas from the gas supply conduit 80 to the gas feed line 104. In the open position, the valve 114 allows natural gas flow from the gas supply conduit 80 to the gas feed line 104.

The inclusion and/or positioning of the filters 108, 110 and/or valves 114 may assist in protecting other components on the carrier 18. In the exemplary arrangement, the placement of the filters 108, 110 and valve 114 at the beginning of the natural gas flow path on the carrier 18 may, in some applications, be particularly beneficial at preventing damage to other components on the carrier 18 caused by the incoming natural gas, potentially saving valuable time, manpower and expense.

Still referring to FIG. 1, the natural gas supply system 10 may include one or more pressure gage 118 at any desired location. In this embodiment, the pressure gage 118 is engaged on the gas supply conduit 80 proximate to its left end 82. In the illustrated configuration of the system 10, this location of the pressure gage 118 allows convenient viewing of the illustrated gage 118 to measure the pressure of natural gas entering the gas supply conduit 80 from the gas source 130 (e.g. FIG. 3) or an adjacent carrier 18.

The various components of the natural gas supply system 10 may be connected in any suitable manner. For example, flanges 120 (FIG. 2) and elbow pipe 112 (FIG. 3) may be used between various components as needed or desired. In many applications, the flanges 120 may be advantageous over other types of connections, such as threaded connections, by providing stronger seals, reducing gas leakage at the connection points.

Figure 2:
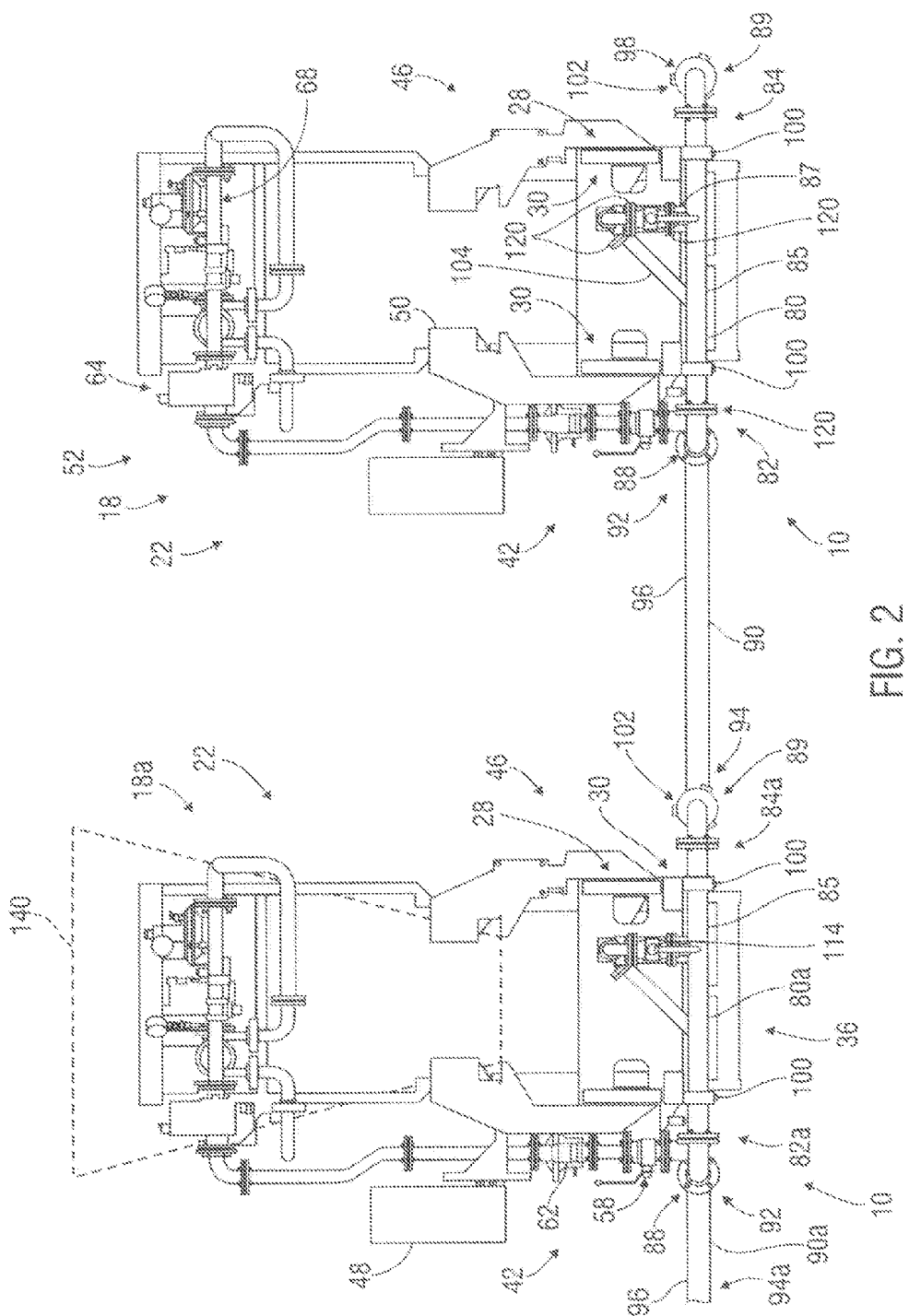
FIG. 2 is a perspective view of two separate interconnected exemplary natural gas supply systems of the type shown in FIG. 1.

Referring now to FIG. 2, the gas supply conduit 80 may be mounted to the carrier 18 in any suitable manner. In this embodiment, the gas supply conduit 80 is mounted to the underside of the frame 28. For example, the gas supply conduit 80 may engage a mounting bracket 100 extending from the bottom of each illustrated frame rail 30 proximate to the rear end 36 of the unit 22. As used herein and in the appended claims, the phrase "proximate to the rear end" means closer to the rear end than to the front end. The mounting bracket(s) 100 may have any suitable form, configuration and operation. One example of a mounting bracket 100 that may be useful with some embodiments of the system 100 is a stauff clamp. The exemplary gas supply conduit 80 is shown extending widthwise, or laterally, below the frame 28 across its left and right sides 42, 46. In some applications, this location and orientation of the gas supply conduit 80 may accommodate easy interconnection of the gas supply systems 10 of multiple carriers 18, such as described below.

Figure 3:
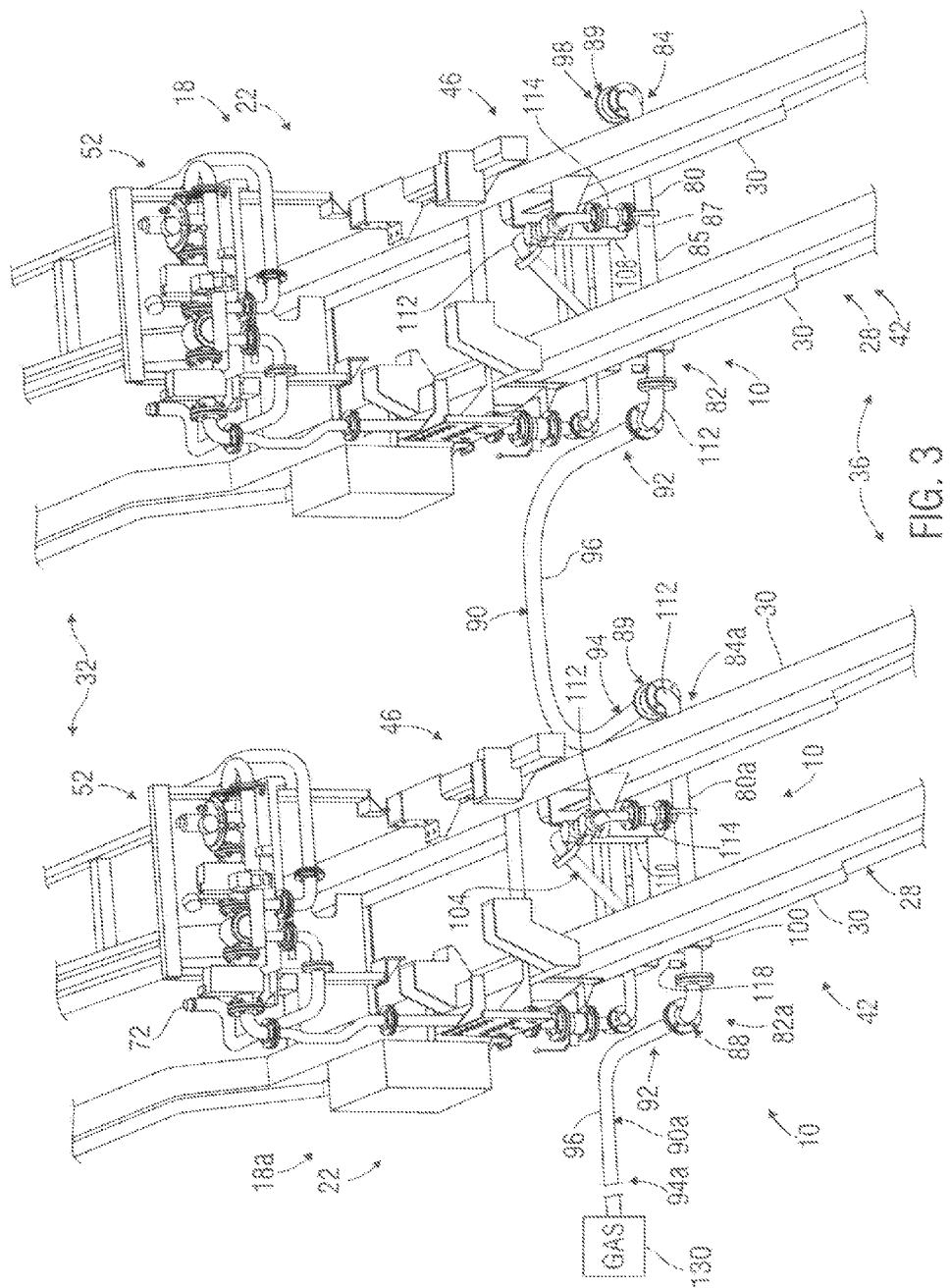
FIG. 3 is a rear view of the exemplary carriers and associated gas supply systems of FIG. 2.

Now referring to FIG. 3, in this embodiment, at least one end 92, 94 of the exemplary connector conduit 90 may be disconnected from the associated gas supply conduit 80, extended outwardly therefrom and selectively releasably mechanically and fluidly engaged with an end 82a, 84a of the gas supply conduit 80a mounted on another carrier 18a, or any other equipment. For example, when the engines 140 (e.g. FIG. 2) on multiple carriers 18 require natural gas, the right end 94 of the illustrated connector conduit 90 of the second carrier 18 is releasably connected to the right end 84a of the gas supply conduit 80a of the first carrier 18a. The connector conduit 90 of a third carrier 18 would be similarly releasably connected to the gas supply conduit 80 of the second carrier 18, and so on. At the far ends of the exemplary interconnected chain of carriers 18, the right end 94a of the leftmost connector conduit 90a is releasably connectable to the gas source 130, while the open right end 84 of the gas supply conduit 80 at the far right end of the chain is plugged off. In this manner, the exemplary natural gas supply systems 10 on multiple carriers 18 are fluidly daisy-chained together so that natural gas can be provided to each successive interconnected carrier 18.

While the illustrated exemplary natural gas supply system 10 is configured to be connected going to the left, the present disclosure includes embodiments in which the systems 10 are connected in the same or a similar manner, but going to the right. Furthermore, the system 10 may be configured to allow releasable connection of both ends 92, 94 of the connector conduit 90 to/from its associated gas supply conduit 80 and other equipment.

The connector conduit 90 may be releasably connectable at one or both of its ends 92, 94 to one or more gas supply conduits 80, the gas source 130 or any other suitable equipment in any desired manner. In this embodiment, the coupling 89 on the right end 84 of each gas supply conduit 80 is a releasable coupling 102 to allow the right end 94 of the associated connector conduit 90 to be releasable and connected to other components. If desired, the coupling 88 on the left end 82 of the gas supply conduit 80 could also, or instead, be a releasable coupling. The releasable coupling 102 may have any suitable form, configuration and operation. One example of a releasable coupling 102 that may be useful in some embodiments is a hammer union coupling. In applications using a hammer union coupling, for example, the only tool or equipment necessary for use by an operator in conjunction with connecting the gas source 130 to multiple engines 140 (e.g. FIG. 2) may be a hammer.

Still referring to FIG. 3, when the connector conduit 90 is disconnected from its associated gas supply conduit 80 at one end, and another connector conduit 90 or other component is not connected at that end of the gas supply conduit 80, a plug 98 may be used to plug off the conduit 80. For example, when a series of carriers 18 is interconnected via the exemplary connector conduits 90, such as described above, the right side 84 of the gas supply conduit 80 on the far rightmost carrier 18 may be plugged-off with a plug 98 engaged to the coupling 89 to dead-head that gas supply conduit 80 and the chain of systems 10. The plug 98 may have any suitable form, configuration and operation. In some embodiments, for example, the plug 98 may be a screw-on cap.

In accordance with many embodiments of the present disclosure, the natural gas supply system 10 allows supplying natural gas to a series of engines 140 (e.g. FIG. 2) on different carriers 18 having all components integral to the carriers 18 and requiring minimal rig-up and rig-down time. In some embodiments, rig-up only requires detaching one end of the connector conduit 90 from each natural gas supply system 10 and connecting it to an adjacent system 10 or the gas source 130. These various embodiments eliminate the need for operators to carry and run pipe and/or hoses and rig-up and rig-down multiple connections at the work site, reducing the time, equipment, tools and manpower needed for connecting and disconnecting multiple engines 140 to the gas source 130.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Apparatus for providing natural gas from an external gas source to engines disposed upon multiple mobile hydraulic fracturing pump units, each pump unit carrying at least one engine, the apparatus comprising:
a natural gas supply system disposed upon each hydraulic fracturing pump unit, each said natural gas supply system including
a gas supply conduit mounted to the associated hydraulic fracturing pump unit, said gas supply conduit having first and second ends and at least one fluid flow port formed therebetween, said fluid flow port fluidly communicating with the engine of the pump unit, and
a connector conduit having first and second ends and being mechanically and fluidly engaged at said first end with said gas supply conduit at its said first end, said second end of said connector conduit being configured to be extended outwardly relative to said gas supply conduit and selectively releasably mechanically and fluidly engaged with one among the gas source and said second end of said gas supply conduit of another pump unit,
whereby a first mobile hydraulic fracturing pump unit is connectable to the gas source for providing natural gas to its engine and the engine of each successively mechanically and fluidly interconnected mobile hydraulic fracturing pump unit.

2. The apparatus of claim 1 wherein said connector conduit is a flexible hose.

3. The apparatus of claim 2 wherein said second end of said connector conduit is selectively releasably mechanically engageable with said second end of said gas supply conduit to which it is connected at its said first end for storage during non-use thereof.

4. The apparatus of claim 2 wherein each mobile hydraulic fracturing pump unit includes an elongated frame extending from the front to the rear ends thereof, wherein said gas supply conduit is mounted to the frame proximate to the rear end thereof.

5. The apparatus of claim 4 wherein the frame has left and right sides, further including at least two mounting bracket disposed on the underside of the frame, wherein said gas supply conduit is engaged with said at least two mounting brackets and extends laterally below the frame from the left to the right sides thereof.

6. The apparatus of claim 2 wherein said gas supply conduit is a rigid pipe.

7. The apparatus of claim 6 further including first and second couplings disposed upon said first and second ends of said gas supply conduit, respectively.

8. The apparatus of claim 7 further including a removable cap releasably engageable with the second coupling of said gas supply conduit of the mobile hydraulic fracturing pump unit located farthest away from the gas source.

9. The apparatus of claim 7 wherein said second end of said connector conduit is selectively releasably mechanically engageable with said second end of said gas supply conduit to which it is connected at its said first end for storage during non-use thereof.

10. The apparatus of claim 1 wherein the mobile hydraulic fracturing pump unit includes a gas inflow system fluidly coupled to the engine and including at least a first control valve, pressure regulator, gas train and gas supply manifold, further including
at least one gas feed line fluidly coupling at least one said fluid flow port of said gas supply conduit with the gas inflow system,
at least one particulate filter fluidly coupled to said gas feed line proximate to said gas supply conduit, and
at least one coalescing filter fluidly coupled to said gas feed line proximate to said gas supply conduit,
wherein water and particulate matter are filtered out of the natural gas inflow from the gas source before reaching the gas inflow system of the mobile hydraulic fracturing pump unit.

11. The apparatus of claim 10 further including at least a second control valve in fluid communication with said port of said gas supply conduit, said second control valve configured to be selectively movable between at least one open position and at least one closed position, said second control valve in said closed position preventing the flow of natural gas from said gas supply conduit to said gas feed line and in said open position allowing the flow of natural gas from said gas supply conduit to said gas feed line.

12. The apparatus of claim 11 wherein said second control valve is a manual ball valve.

13. The apparatus of claim 11 wherein said second control valve is disposed adjacent to said at least one port of said gas supply conduit.

14. Apparatus for providing natural gas from an external gas source to multiple engines disposed on multiple carriers, each carrier having at least one engine thereon, the apparatus comprising:
a natural gas supply system disposed upon each carrier, each said natural gas supply system including
a rigid gas supply conduit mounted to the associated carrier, said gas supply conduit having first and second ends and at least one fluid flow port formed therebetween,
a gas feed line fluidly coupling said fluid flow port of said rigid gas supply conduit to the engine of the associated carrier,
a fluid flow control valve fluidly coupling said fluid flow port of said rigid gas supply conduit and said gas feed line and being disposed proximate to said fluid flow port of said rigid gas supply conduit, said fluid flow control valve configured to be selectively movable between at least one open position and at least one closed position, said fluid flow control valve in said closed position preventing the flow of natural gas from said rigid gas supply conduit to said gas feed line and in said open position allowing the flow of natural gas from said rigid gas supply conduit to said gas feed line,
at least one particulate filter disposed between and in fluid communication with said rigid gas supply conduit and said gas feed line,
at least one coalescing filter disposed between and in fluid communication with said rigid gas supply conduit and said gas feed line,
a flexible connector conduit having first and second ends and being mechanically and fluidly engaged at said first end with said rigid gas supply conduit at its said first end, said second end of said flexible connector conduit being configured to be extended outwardly relative to said rigid gas supply conduit and selectively releasably mechanically and fluidly engaged with one among the gas source and said second end of said rigid gas supply conduit of another carrier,
whereby a series of engines disposed upon different carriers may be fluidly interconnected for delivering natural gas to each engine.

15. The apparatus of claim 14 wherein said second end of said flexible connector conduit of said natural gas supply system of a first carrier is configured to fluidly and mechanically engage the gas source.

16. The apparatus of claim 14 wherein said second end of said flexible connector conduit is selectively releasably mechanically engageable with said second end of said gas supply conduit to which it is connected at its said first end for storage during non-use thereof.

17. The apparatus of claim 14 wherein each carrier includes an elongated frame having two elongated frame rails extending from the front to the rear ends thereof, further including first and second mounting brackets disposed on the underside of the elongated frame rails, respectively, wherein said gas supply conduit is configured to engage and be carried by said mounting brackets and extend laterally below the frame from the left to the right sides thereof.

18. A method of providing natural gas from an external gas source to multiple engines disposed upon multiple mobile hydraulic fracturing pump units, each pump unit carrying at least one engine, the method comprising:
fluidly and mechanically releasably connecting a first end of a flexible connector conduit extending from a rigid gas supply conduit mounted on a first pump unit to the gas source, the second end of the flexible connector conduit being mechanically and fluidly coupled to the first end of the rigid gas supply conduit;
fluidly and mechanically releasably connecting a first end of a flexible connector conduit extending from a rigid gas supply conduit mounted on a second pump unit to the second end of the rigid gas supply conduit of the first pump unit, the second end of the flexible connector conduit of the second pump unit being mechanically and fluidly coupled to the first end of the rigid gas supply conduit on the second pump unit;
fluidly and mechanically releasably connecting a first end of a flexible connector conduit extending from a rigid gas supply conduit mounted on a third pump unit to the second end of the rigid gas supply conduit of the second pump unit, the second end of the flexible connector conduit of the third pump unit being mechanically and fluidly coupled to the first end of the rigid gas supply conduit on the third pump unit; and
capping off the second end of the rigid gas supply conduit on the third pump unit.

19. The method of claim 18 further including
removing the cap from the second end of the rigid gas supply conduit on the third pump unit;
disconnecting the first end of the flexible connector conduit of the third pump unit from the second end of the rigid gas supply conduit of the second pump unit and releasably connecting it to the second end of the rigid gas supply conduit of the third pump unit;

disconnecting the first end of the flexible connector conduit of the second pump unit from the second end of the rigid gas supply conduit of the first pump unit and releasably connecting it to the second end of the rigid gas supply conduit of the second pump; and disconnecting the first end of the flexible connector conduit of the first pump unit from the gas source and releasably connecting it to the second end of the rigid gas supply conduit on the first pump unit.

* * * * *